R. STREHLAU.
LIFTING AND DRIVING PROPELLER.
APPLICATION FILED APR. 21, 1909.
935,130.
Patented Sept. 28, 1909.
2 SHEETS—SHEET 1
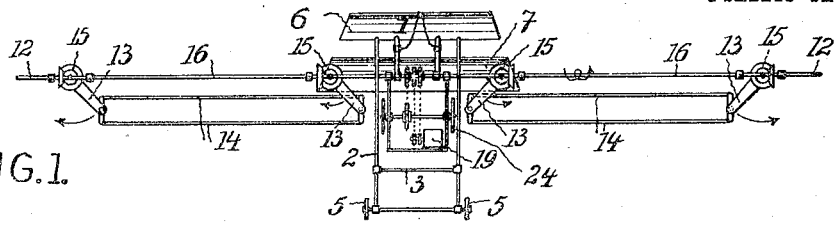
FIG.1.
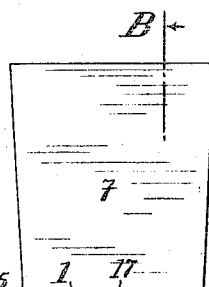
FIG.2.
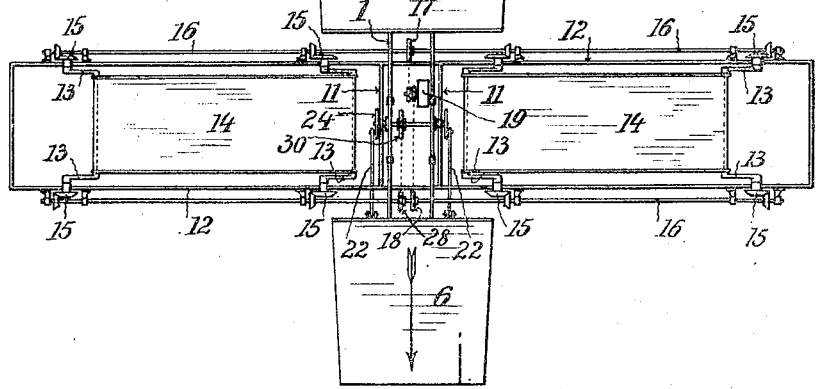
FIG.3.
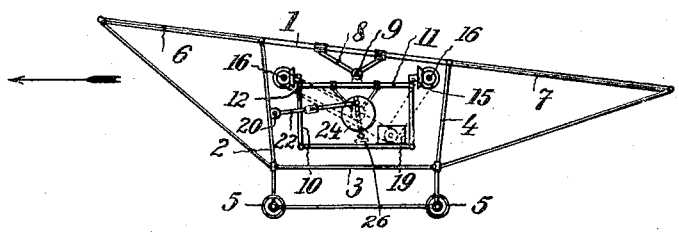
FIG.4.   FIG.5.
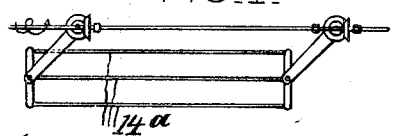
Witnesses:
M. G. Crandell
J. J. McCarthy
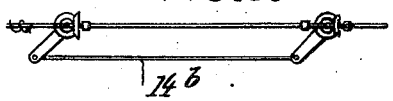
Inventor
Robert Strehlau
by Foster Freeman Watson & Coit
Attorneys R. STREHLAU.
LIFTING AND DRIVING PROPELLER.
APPLICATION FILED APR. 21, 1909.
935,130.
Patented Sept. 28, 1909.
2 SHEETS—SHEET 2.
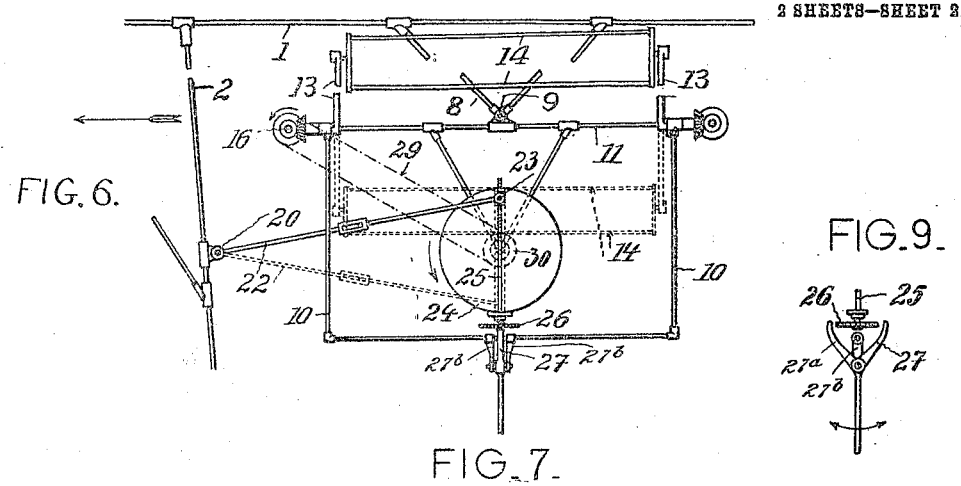
FIG. 6.
FIG. 9.
FIG. 7.
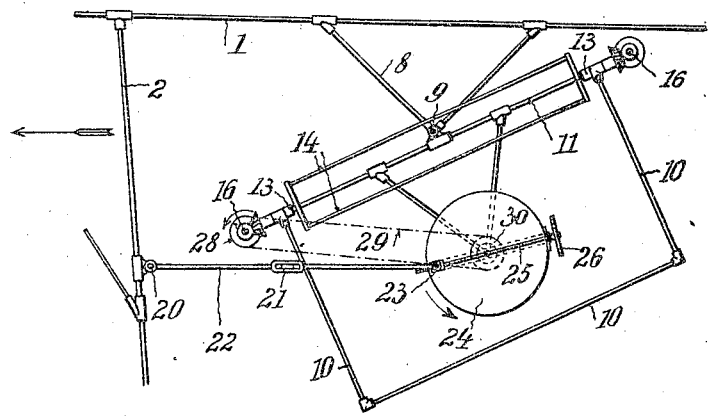
FIG. 8.
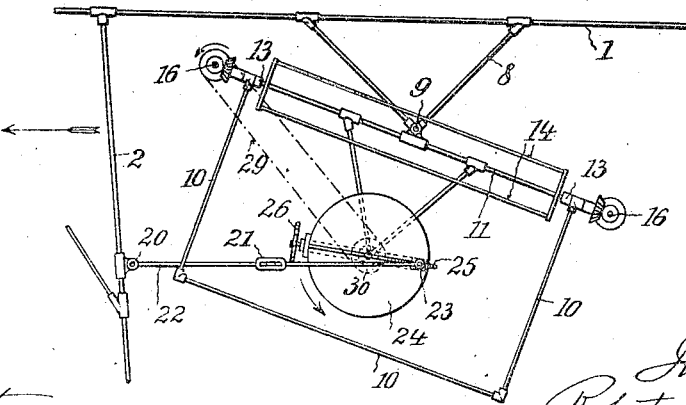
Witnesses:
M. P. Crandell
J. J. McCarthy
Inventor:
Robert Strehlau
by Fraser Freeman Watson & Coit
Attorneys

UNITED STATES PATENT OFFICE.

ROBERT STREHLAU, OF WESTEND, NEAR BERLIN, GERMANY.

LIFTING AND DRIVING PROPELLER.

935,130.
Specification of Letters Patent. Patented Sept. 28, 1909.
Application filed April 21, 1909. Serial No. 491,394.

*To all whom it may concern:*

Be it known that I, ROBERT STREHLAU, a subject of the German Emperor, and residing at Westend, near Berlin, Germany, have invented certain new and useful Improved Lifting and Driving Propellers, of which the following is a specification.

The subject-matter of my invention is an improved device for imparting an upwardly and forwardly impelling force to vehicles of all kinds.

In order to be able to impart to vehicles of all kinds, whether these are to move in the air, on water or on a firm foundation, for example on rails, snow, ice or directly on the ground, an upwardly or downwardly impelling force and a forward and backward motion as desired, according to my invention I employ a device in which wings driven by a motor are moved in a definite manner in the air and the forces acting in various directions are utilized for moving the vehicles correspondingly. One or more pairs of wings, which preferably comprise frames carrying canvass stretched thereon, are arranged singly, or several superposed, symmetrically relatively to a vertical central plane through the device, as in a bird floating in the air, and the motor imparts to them a double movement, namely an upwardly and downwardly directed parallel movement and a rocking motion in the direction of travel. The wings are preferably moved upwardly and downwardly by connecting the wing-frames to the pins of cranks whose axes are horizontal in the normal position of the device and which rotate in opposite directions on the two sides of a supposed central plane. The wings are preferably rocked in the direction of travel by causing both the wing-frames which can rock round an axle and with them the wings to be tilted with their front edges downward every time they move downward and with their front edges upward every time they move upward.

In order that my invention may be clearly understood I will now describe the same with reference to the accompanying drawings in which some embodiments are represented by way of example.

In said drawings:—Figure 1 is a front elevation of the device, Fig. 2 is a top plan view, and Fig. 3 a vertical section in the plane A—B in Fig. 2, Figs. 4 and 5 are details of parts of modified forms, whereas Figs. 6, 7 and 8 are side elevations of part of the device on an enlarged scale showing the principal positions of the wing-frame which is adjustable in the direction of travel to different angles, and Fig. 9 is a front elevation of the lever used for radially moving the crank-pins for the wing-frames.

Similar reference characters designate like parts in all views.

Referring to the drawings, on a frame 1, 2, 3 and 4, which carries wheels 5 and parachute-like surfaces 6 and 7 in the event of the device being used as a flying machine, there is provided on the rods 1 a suspension device 8, on which a frame 10, 11 is mounted to rock round pivots 9. As clearly shown in Fig. 2, with the rods 11 there are rigidly connected rods 12, on which again the cranks 13 for the wings 14 are journaled. The crank-shafts carry bevel wheels 15 which together with the counter-shafts 16 are driven by means of sprocket wheels 17, 18 by the motor 19 and, as indicated by curved arrows in Fig. 1, drive the wings parallelly in opposite directions upwardly and downwardly. In Fig. 4 a triple wing 14$^a$ and in Fig. 5 a single wing 14$^b$ is shown instead of double wings 14 as in Fig. 1 on each side of the device.

In order to move the pairs of wings not only parallelly upwardly and downwardly, but also to tilt them in the direction of travel, a device is provided which sets the wing-frame 10, 11 at the desired inclination. For this purpose two rods 22 are pivotally connected at their ends with the frame members 2 and a pair of rotatable disks 24. Preferably said rods are each made in two sections connected by a turn-buckle 21 by means of which the length of the rods may be slightly varied. The said rods are adjustably connected with the disks 24, the latter each being provided with a screw rod 25 on which is mounted a block or sleeve 23 to which the adjacent section of the rod 22 is connected.

Means are provided for turning the spindles or screw rods 25 to adjust the sleeves or blocks 23 radially of the disk, such means including a toothed wheel 26 secured to one end of the spindle and a lever fulcrumed on the inner frame and having two dogs or teeth 27, 27$^a$. As shown particularly in Figs. 6 and 9 the said lever is supported by two ears 27$^b$ loosely surrounding the lower bar of the inner frame, and between which are arranged the dogs 27, 27ª. The latter are separated to such an extent that when the lever is in a vertical position, or as shown in Figs. 6 and 9, the toothed wheel 26 will pass freely between them as the disk 24 is rotated. When however it is desired to adjust the sleeve or block 23 on said disk the lever is rocked to cause one of the other dogs 27, 27ª to engage the toothed wheel 26, and thereby turn the shaft or spindle 25. It will be evident that the direction of the movement of said spindle and sleeve or block 23 will depend upon which of the dogs 27, 27ª is caused to engage the wheel 26. The disk-crank 24 is driven by sprocket-wheels 28 and 30 and chain 29 from one of the counter-shafts 16, as clearly shown.

By means of the connecting rods 22, the frame 10, 11 and with it the wings are rocked simultaneously as the latter are moved upwardly and downwardly. In the highest position of the wings as shown in Fig. 6 they are horizontal, in the half-way position when moving downward they are tilted according to Fig. 7, in their lowest position they are horizontal again as shown in dotted lines in Fig. 6, and in the half-way position when moving upward they are tilted according to Fig. 8. The straight arrows indicate the direction of travel. The movements of the wings are repeated in like manner. Owing to this double movement an upwardly and a forwardly impelling force act simultaneously on the device.

If it is wished to use the device for vehicles adapted to travel on water or land, it is only necessary to connect them in suitable manner with the device.

I claim:—

1. In a device for imparting an upwardly and forwardly impelling force to vehicles of all kinds, the combination, with a frame, of wings mounted movably thereon arranged symmetrically with regard to the center thereof, a source of power, means driven from the latter for driving the wings parallelly upwardly and downwardly, and means driven by the source of power for simultaneously rocking the wings during their upward and downward motion.

2. In a device for imparting an upwardly and forwardly impelling force to vehicles of all kinds, the combination, with a frame, of wings mounted movably thereon arranged symmetrically with regard to the center thereof, a source of power, means driven from the latter for driving the wings parallelly in opposite horizontal directions upwardly and downwardly, and means driven by the source of power for simultaneously rocking the wings during their upward and downward motion.

3. In a device for imparting an upwardly and forwardly impelling force to vehicles of all kinds, the combination, with a frame, of wings mounted movably thereon arranged symmetrically with regard to the center thereof, a source of power, means driven from the latter for positively driving the wings parallelly upwardly and downwardly, and means driven by the source of power for simultaneously positively rocking the wings during their upward and downward motion.

4. In a device for imparting an upwardly and forwardly impelling force to vehicles of all kinds, the combination, with a frame, of an inner frame pivotally suspended therefrom, cranks journaled on the inner frame, wings carried by said cranks and arranged symmetrically with regard to the center of the former frame, a motor carried by the inner frame, and gearing, substantially as shown, driven by said motor for rotating said cranks and driving said wings parallelly in opposite horizontal directions upwardly and downwardly.

5. In a device for imparting an upwardly and forwardly impelling force to vehicles of all kinds, the combination, with a frame, of an inner frame pivotally suspended therefrom, cranks journaled on the inner frame, wings carried by said cranks and arranged symmetrically with regard to the center of the former frame, a motor carried by the inner frame, gearing, substantially as shown, driven by said motor for rotating said cranks and driving said wings parallelly in opposite horizontal directions upwardly and downwardly, and crank-operated means driven by said motor for simultaneously rocking said wings during their upward and downward movement.

6. In a device for imparting an upwardly and forwardly impelling force to vehicles of all kinds, the combination with a frame, of an inner frame pivotally suspended therefrom, cranks journaled on the inner frame, wings carried by said cranks and arranged symmetrically with regard to the center of the former frame, a motor carried by the inner frame, gearing, substantially as shown, driven by said motor for rotating said cranks and driving said wings parallelly in opposite horizontal directions upwardly and downwardly, and adjustable crank-operated means, substantially as shown, driven by said motor for simultaneously rocking said wings during their upward and downward movement.

7. In a device for imparting an upwardly and forwardly impelling force to vehicles of all kinds, the combination, with a frame, of an inner frame pivotally suspended therefrom, cranks journaled on the inner frame, wings carried by said cranks and arranged symmetrically with regard to the center of the former frame, a motor carried by the inner frame, gearing, substantially as shown, driven by said motor for rotating said cranks and driving said wings parallelly in opposite horizontal directions upwardly and downwardly, adjustable crank operated means, substantially as shown, driven by said motor for simultaneously rocking said wings during their upward and downward movement, and means for varying the operation of said crank-operated means.

8. In a device for imparting an upwardly and forwardly impelling force to vehicles of all kinds, the combination, with a frame, of an inner frame pivotally suspended therefrom, a motor carried by said inner frame, a disk crank journaled in said inner frame and driven by said motor; said disk crank comprising a disk, a screwed spindle journaled thereon, a crank pin movable on said spindle; and a connecting-rod connected with the former frame and said pin.

9. In a device for imparting an upwardly and forwardly impelling force to vehicles of all kinds, the combination, with a frame, of an inner frame pivotally suspended therefrom, a motor carried by said inner frame, a disk crank journaled in said inner frame and driven by said motor; said disk crank comprising a disk, a screwed spindle journaled thereon, a crank pin movable on said spindle; a connecting-rod connected with the former frame and said pin, a toothed wheel on said spindle outside said disk, and a two-armed lever fulcrumed on said inner frame adapted to engage with said wheel.

10. In a device for imparting an upwardly and forwardly impelling force to vehicles of all kinds, the combination, with a frame, of an inner frame pivotally suspended therefrom, cranks journaled on said inner frame, double wings carried by said cranks, a motor carried by said inner frame, and gearing connecting the motor with said cranks and driving said wings parallelly in opposite horizontal directions upwardly and downwardly.

In testimony whereof, I affix my signature in the presence of two witnesses.

ROBERT STREHLAU.

Witnesses:
 HENRY HASPER,
 WOLDEMAR HAUPT.